United States Patent [19]

Nomura

[11] Patent Number: 4,667,777

[45] Date of Patent: May 26, 1987

[54] CONTROL APPARATUS FOR A.C. ELEVATOR

[75] Inventor: Masami Nomura, Nagoya, Japan

[73] Assignee: Mitsubishi Denki Kabushiki Kaisha, Tokyo, Japan

[21] Appl. No.: 844,188

[22] Filed: Mar. 26, 1986

[30] Foreign Application Priority Data

Mar. 28, 1985 [JP] Japan .................................. 60-64265

[51] Int. Cl.$^4$ ................................................ B66B 1/30
[52] U.S. Cl. ................................................ 187/112
[58] Field of Search .................... 187/29; 318/757, 759

[56] References Cited

U.S. PATENT DOCUMENTS 4,475,631 10/1984 Nomura ............................ 187/29 R
4,501,343 2/1985 Salihi ................................ 187/29 R
4,545,464 10/1985 Nomura ............................ 187/29 R
4,548,299 10/1985 Nomura ............................ 187/29 R
4,602,701 7/1986 Tanahashi ........................ 187/29 R Primary Examiner—Charles D. Miller
Assistant Examiner—W. E. Duncanson, Jr.
Attorney, Agent, or Firm—Leydig, Voit & Mayer

[57] ABSTRACT

A control apparatus for an A.C. elevator wherein regenerative power produced from an induction motor is consumed within the motor. In case of causing the induction motor to generate a braking torque, current to be supplied to the induction motor is controlled in accordance with a current command value having a frequency which does not generate regenerative power and an amplitude which is based on a torque command. Thus, the regenerative power is prevented from arising in the slowdown mode and unloaded operation of the elevator, and a good controllability is attained without spoiling a comfortable ride.

6 Claims, 8 Drawing Figures

CONTROL APPARATUS FOR A.C. ELEVATOR

BACKGROUND OF THE INVENTION

This invention relates to a control apparatus for use in an A.C. elevator in which an induction motor for running a cage is driven by a variable-frequency power source.

An A.C. elevator uses an induction electric motor for driving the cage of the elevator, and the induction motor is supplied with the output of a variable-frequency power source, whereby a torque control is performed by varying a slip frequency. In this regard, there has been proposed a method in which the frequency and voltage of the power source to be applied to the induction motor are controlled so as to prevent regenerative power from developing in the induction motor in case of a braking mode or an unloaded operation (a heavy load descent operation or a light load ascent operation).

FIG. 2 is a simplified equivalent circuit diagram of an induction motor for explaining the above method of preventing the development of regenerative power. In the figure, symbols $l_1$ and $l_2$ denote leakage inductances on the primary side and secondary side of the induction motor respectively, and symbols $r_1$ and $r_2$ resistances on the primary side and secondary side respectively. Letter S indicates a slip, and letters V and I indicate a voltage applied to the induction motor and a current flowing therethrough, respectively.

Here, assuming the slip S to be:

$$S = -r_2/r_1 \tag{1}$$

a mechanical input $P_m$ becomes:

$$P_m = \frac{1-S}{S} r_2 \cdot I^2 = -(r_1 + r_2) I^2 \tag{2}$$

On the other hand, electric power $P_E$ which is consumed in the induction motor becomes:

$$P_E = (r_1 + r_2) I^2 \tag{3}$$

so that the mechanical input and the power consumption in the induction motor equalize. Accordingly, when the induction motor is operated in the slip state satisfying Eq. (1), no regenerative power develops from the induction motor, and the supply of electric power is unnecessary. Meanwhile, letting $\omega_r$ denote the rotational angular velocity of a rotor and $\omega_0$ denote the input angular frequency, the induction motor generates a torque T given below:

$$T = \frac{P_m}{\omega_r} = \frac{1}{(1-S)\omega_0} \cdot \frac{1-S}{S} \cdot r_2 I^2 \tag{4}$$

$$= \frac{r_0}{\omega_0 S} I^2$$

Here, substituting Eq. (1) into Eq. (4), $$T = (r_1 \omega_0) I^2 \tag{5}$$

Further, when $S = -r_2/r_1$ indicated in Eq. (1) is applied to FIG. 2, the following relation between the voltage V and the current I is obtained:

$$V = (l_1 + l_2)\omega_0 I \tag{6}$$

When this equation (6) is substituted into Eq. (5), the following is obtained:

$$T = -\frac{1}{\omega_0^3} \cdot \left(\frac{r_1}{l_1 + l_2}\right) \cdot V^2 \tag{7}$$

Thus, the development of the regenerative power can be prevented by controlling the voltage V on the basis of a torque command.

With the above control method, however, the torque T is inversely proportional to the cube of the input angular frequency $\omega_0$ as indicated in Eq. (7), and a controllability therefor is very inferior. Another problem is that, when the slip S is changed stepwise to the value indicated by Eq. (1) upon the shift of the torque command from power running to braking, current flows to the primary side to generate a transient torque on account of residual current or residual magnetism remaining in the rotor, so a comfortable ride in the cage is not achieved.

SUMMARY OF THE INVENTION

This invention has the objective to solve the problems of the prior art as described above, and has for its main object to provide a control apparatus for an A.C. elevator which prevents regenerative power from developing in the slowdown mode and unloaded operation of the elevator and which ensures a good controllability as well as a comfortable ride.

The control apparatus for an A.C. elevator according to this invention performs a control so that, in case of causing an induction motor to generate a control torque, current may be supplied to the induction motor in conformity with a current command value which has a frequency not incurring regenerative power and an amplitude based on a torque command.

In the control apparatus for an A.C. elevator thus constructed, the current itself is controlled, and hence, the controllability of the torque is enhanced much more than in the prior art. Moreover, an excess torque is not feared to arise at the change-over of power running to braking, so that the elevator control apparatus affords a comfortable ride.

DESCRIPTION OF THE PREFERRED EMBODIMENTS

Figure 1:
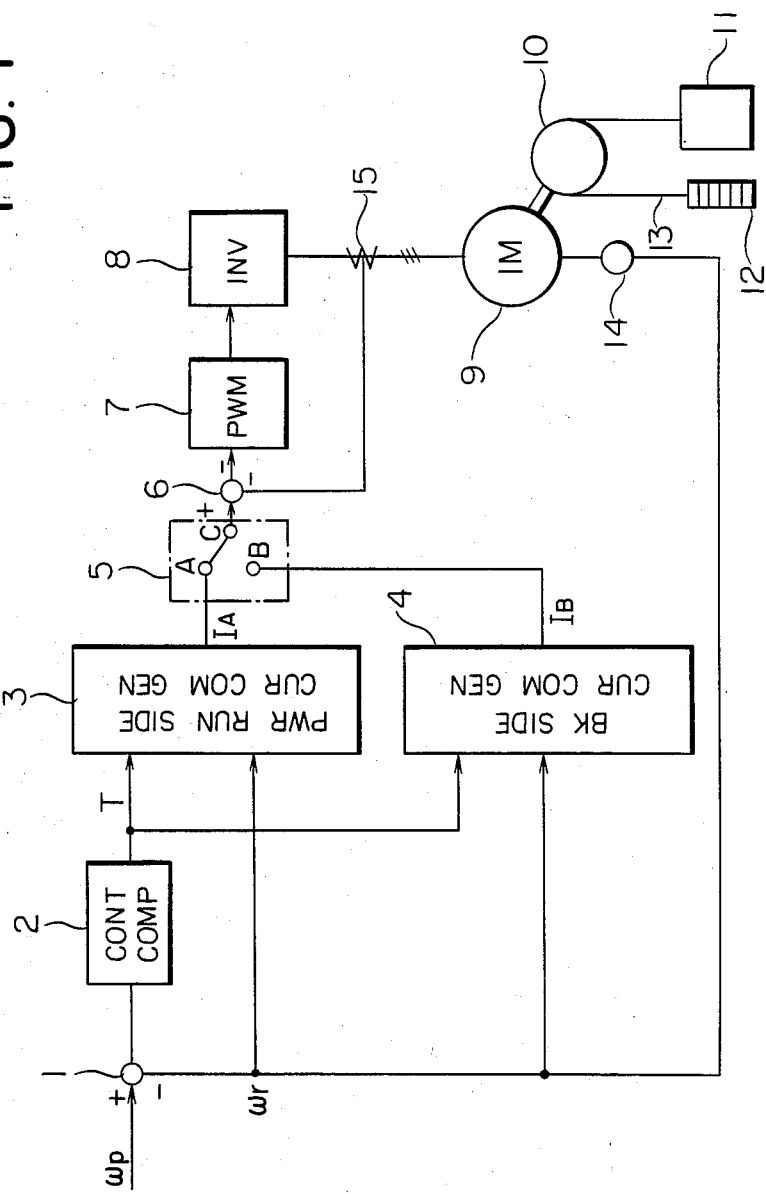
FIG. 1 is a circuit diagram showing an embodiment of a control apparatus for an A.C. elevator according to this invention.
Figure 2:
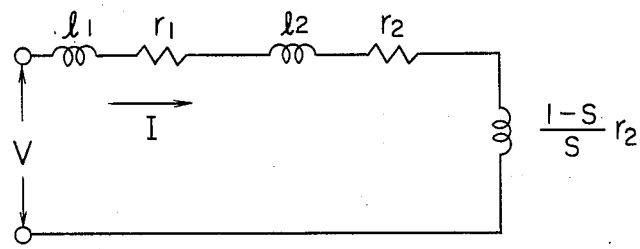
FIG. 2 is a simplified equivalent circuit diagram of an induction motor for explaining the principle of a control method in a prior-art control apparatus for an A.C. elevator.

FIG. 1 is a circuit diagram which shows one embodiment of a control apparatus for an A.C. elevator according to this invention. Referring to the figure, numeral 1 designates a subtracter by which an actual velocity signal $\omega_r$ provided by a tachometer generator 14 to be described later is subtracted from an angular velocity command signal $\omega_p$, numeral 2 a control compensator which subjects the output signal of the subtracter 1 to phase compensation, and numeral 3 a power running side current command generator which receives the actual velocity signal $\omega_r$ and a torque command signal T provided from the control compensator 2, thereby to deliver an instantaneous current command value $I_A$ in a power running mode. Numeral 4 designates a braking side instantaneous current command generator, which receives the torque command signal T and the actual velocity signal $\omega_r$ thereby to deliver a current command value $I_B$ in a braking mode. A switch 5 selects either the current command value $I_A$ in the power running mode or the current command value $I_B$ in the braking mode, and is changed-over according to the sign of the torque command signal T delivered from the control compensator 2.

The embodiment further comprises a subtracter 6 by which the output of a current detector 15 to be described later, from the current command value $I_A$ or $I_B$ selected by the switch 5, a pulse width modulator 7 which receives the output signal of the subtracter 6 and subjects it to pulse width modulation, and an inverter 8 which is controlled by the pulse width modulator 7. The A.C. elevator includes an induction motor 9 which is driven by a variable-voltage and variable-frequency power source, and a sheave 10 which is driven by the induction motor 9 and round which a wire 13 with a cage 11 and a weight 12 fixed to both its ends is wound. The tachometer generator is shown at numeral 14, and the current detector at numeral 15.

In the control apparatus for the A.C. elevator constructed as described above, in a case where the torque command signal T which is output from the control compensator 2 receiving the output signal of the subtracter 1 for the subtraction of the actual angular velocity signal $\omega_r$ from the angular velocity command signal $\omega_p$ is plus, that is, where a power running torque is to be generated, the switch 5 selects the current command value $I_A$ which is produced from the power running side current command generator 3 receiving the torque command signal T and the actual velocity signal $\omega_r$. The output signal of the switch 5 has the output signal of the current detector 15 subtracted therefrom in the subtracter 6, that is, it is compared with the actual current, whereupon a necessary current command is supplied to the pulse width modulator 7. The pulse width modulator 7 controls the inverter 8 in accordance with the required current command, whereby current to be fed from the inverter 8 to the induction motor 9 is controlled so as to control the torque to-be-generated.

Next, in case of generating a control torque for which the torque command signal T provided from the control compensator 2 becomes minus, a velocity command signal $\omega_0$ is obtained from the actual velocity signal $\omega_r$ on the basis of the following equations:

$$\omega_r = (1-S)\omega_0 \tag{8}$$

Substituting $S = -r_2/r_1$ into Eq. (8), $$\omega_0 = \omega_r/(1+r_2/r_1) \tag{9}$$

On the other hand, the following is obtained from the torque command signal T on the basis of the equation (5) mentioned before:

$$I = K\sqrt{T \cdot \omega_0} \tag{10}$$

Accordingly, the braking side current command generator 4 produces the instantaneous current command value $I_B$ which has the amplitude and the angular frequency obtained from Eq. 10 and Eq. 9 respectively, and which is supplied to the subtracter 6 through the switch 5. The subtracter 6 finds the difference between the instantaneous current command value $I_B$ and the actual measurement value delivered from the current detector 15 and applies it to the inverter 8 through the pulse width modulator 7, whereby a current value to be fed to the indusion motor 9 is controlled to a target value.

The above embodiment has been described as to the case of selecting the respective current command values $I_A$ and $I_B$ in the power running mode and the braking mode by the use of the switch, but this invention is not restricted thereto. It is needless to say that, in case of employing a microcomputer or the like, a calculation for generating a current command value may be changed according to the sign of a torque command signal.

Next, the principal ones of the constituent elements of the circuit shown in FIG. 1 will be described more in detail.

The control compensator 2 functions to enhance the control performance of the speed feedback control. Although it has various compensatory methods in accordance with the characteristics of controlled systems and can realize a required function with software technology in actuality, a hardware construction will be exemplified here.

Figure 3:
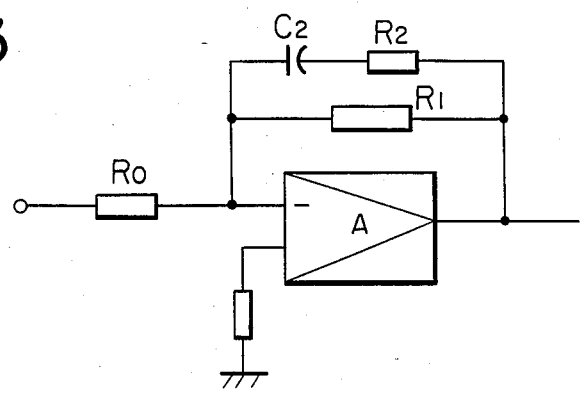
FIG. 3 is an electric circuit diagram showing the internal arrangement of a control compensator.

FIG. 3 shows an example of the control compensator 2, which comprises an operational amplifier A, a capacitor $C_2$ and resistors $R_0$, $R_1$ and $R_2$.

Figure 4:
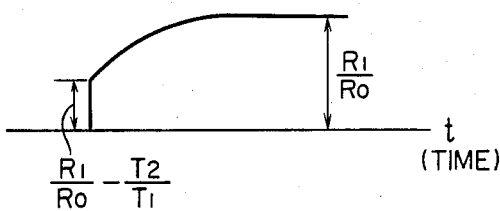
FIG. 4 is a diagram illustrative of the output of the control compensator in FIG. 3.

The transfer function F(S) of this circuit is given by:

$$F(S) = \frac{R_1}{R_0} \times \frac{T_2 S + 1}{T_1 S + 1}$$

where $T_1 = (R_1 + R_2)C_2$ and $T_2 = R_2 C_2$. This circuit generates an output as shown in FIG. 4. The deviation between a speed command and an actual speed is not directly used as a torque command, but the time variation of the deviation is moderated in order to stabilize the speed control.

The compensator in FIG. 3 serves to raise a gain in a low frequency region so as to diminish a steady deviation.

The output of the control compensator 2 becomes the torque command, and the control needs to be changed depending upon the sign of the output. The control change should preferably be realized in software fashion. However, it will be described with reference to a circuit in FIG. 5 here in order to facilitate understanding.

Figure 5:
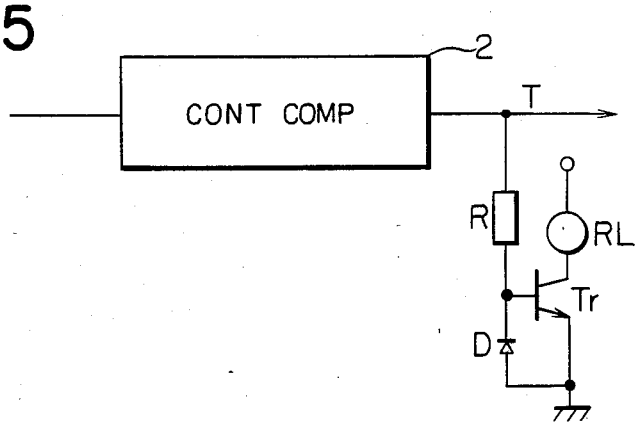
FIG. 5 is an electric circuit diagram showing an example of a practicable operating circuit of a selector switch.

In FIG. 5, symbol R denotes a resistor, symbol RL a relay corresponding to the selector switch 5 in FIG. 1, symbol Tr a transistor, and symbol D a diode.

When the output T of the control compensator 2 is plus, the transistor Tr turns "on" to energize the relay RL, the switch of which connects A–C in FIG. 1.

On the other hand, when the output T is minus, the transistor Tr turns "off" to deenergize the relay RL, the switch of which connects B–C in FIG. 1.

The control change is effected by such operations.

The power running side current command generator 3 has been proposed in various forms, and is often realized with software technology. However, an example employing a hardware circuit will be exemplified here.

Before describing a practical circuit, the equivalent circuit of an induction motor will be explained.

Figure 6:
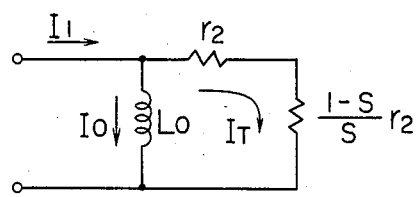
FIG. 6 is an equivalent circuit diagram of an induction motor.

In FIG. 6, symbol $L_0$ denotes the excitation inductance of the induction motor, and symbol $r_2$ the secondary resistance thereof.

The output $P_o$ of the motor becomes:

$$P_0 = \frac{1-S}{S} r_2 I_T^2 \qquad (11)$$

On the other hand, the output torque T is given as follows when the angular velocity of the motor is denoted by $\omega_r$:

$$T = \frac{P_0}{\omega_r} = \frac{1}{\omega_0(1-S)} \cdot \frac{1-S}{S} r_2 I_1^2 \qquad (12)$$

$$T = \frac{r_2}{\omega_s} I_T^2$$

Here, $\omega_s$ denotes the slip frequency and is expressed by $\omega_s = \omega_0 S$.

Next, the following holds in view of the equivalent circuit in FIG. 6:

$$I_o \omega_o L_o = (r_2/S) I_T$$

Accordingly, $$T = \omega_s \cdot (L_o/r_2) \cdot I_o \qquad (13)$$

From Eqs. (12) and (13), $$T = (L_o^2/r_2) \cdot I_o^2 \cdot \omega_s \qquad (14)$$

Therefore, assuming $I_o$ to be constant, $$T = K_1 \cdot \omega_s \qquad (15)$$

Similarly, from Eq. (13), $$I_T = K_2 \cdot \omega_s \qquad (16)$$

These equations (15) and (16) indicate that, assuming the current $I_o$ to be constant, namely, assuming the magnetic flux ($\phi = I_o L_o$) to be constant, the torque T is proportional to the slip frequency, while the current on the secondary side is similarly proportional to $\omega_2$.

Figure 7:
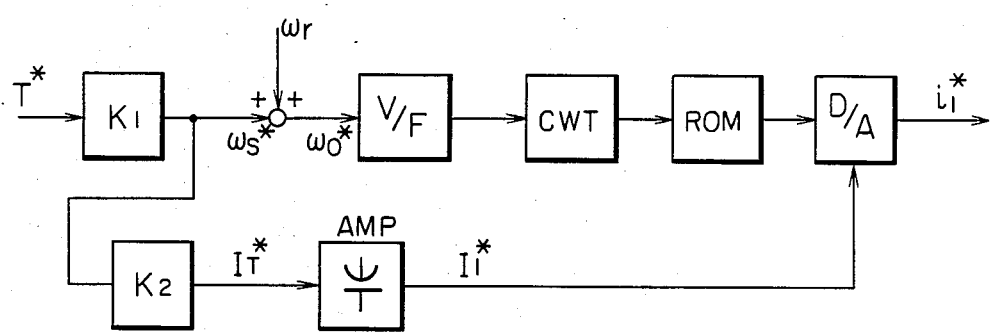
FIG. 7 is an electric block diagram showing the internal arrangement of a power running side current command generator.

Accordingly, when a slip frequency command signal $\omega_s^*$ and a secondary current command signal $I_T^*$ are generated according to a torque command signal $T^*$ as illustrated in FIG. 7, the motor can generate a desired torque.

In FIG. 7, a circuit $K_1$ and a circuit $K_2$ are circuits which calculate $\omega_s^*$ and $I_T^*$ in conformity with Eqs. (15) and (16) and deliver them, respectively. An angular velocity command signal $\omega_o^*$ to be fed to the motor is obtained by adding the actual angular velocity $\omega_r$ to the signal $\omega_s^*$. This signal $\omega_o^*$ is input to a voltage-to-frequency converter V/F, which provides pulses of a frequency changing in accordance with the input. The pulses are input to a couhnter CWT, the output of which causes a memory ROM to produce a binary signal expressive of a unit sinusoidal wave as stored therein. The produced output passes through a digital-to-analog converter D/A and is converted into the analog signal of the unit sinusoidal wave.

On the other hand, the secondary current command signal $I_T^*$ passes through a nonlinear amplifier AMP and becomes a primary voltage command signal $I_1^*$. This signal $I_1^*$ modulates the output amplitude of the D-A converter D/A and forms the analog value of a primary current command $i_1^*$ to be fed to the motor.

When such circuits are disposed for the respective phases, a three-phase current command to be fed to the motor can be produced.

Figure 8:
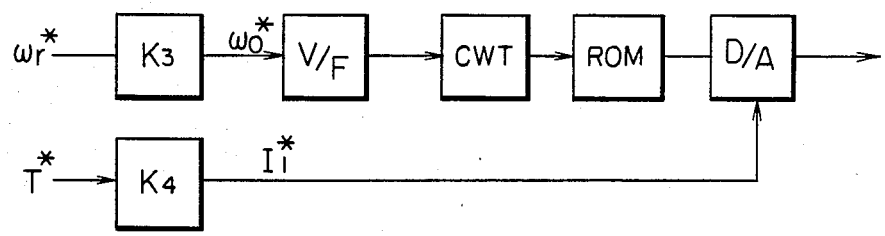
FIG. 8 is an electric block diagram showing the internal arrangement of a braking side current command generator.

The braking side current command generator 4 is arranged as shown in FIG. 8. A circuit $K_3$ provides the frequency command signal $\omega_0^*$ proportional to the actual angular velocity $\omega_r$, and a constant $K_3$ for executing the proportional calculation is expressed by:

$$K_3 = \frac{1}{1 + r_2/r_1}.$$

Also a circuit $K_4$ calculates and provides the current command $I_1^*$ which is proportional to the motor torque command signal $T^*$.

Since the other circuits are similar to the corresponding circuits shown in FIG. 7, they shall not be described in detail.

As described above, in a control apparatus for an A.C. elevator according to this invention, current itself to flow through an induction motor is controlled, so that the controllability of a torque is sharply enhanced. Another remarkable effect is that, since an excess torque is prevented from arising at the change-over of power running to braking, the A.C. elevator can be controlled with a comfortable ride in a cage.

More specifically, unlike the current control type inverter of this invention, the voltage control type inverter in the prior art produces a voltage corresponding to the magnitude of a minus torque command when a torque command has changed from plus to minus. However, when current having been flowing through the rotor of the motor for the plus torque command remains transiently, it causes current to flow to the stator side of the motor. This current is added to an essential current, so that the transient torque develops.

In contrast, with the current control type inverter described in this invention, only current corresponding to the torque command is caused to flow, and no unnecessary current flows, so that the transient torque can be prevented from developing.

What is claimed is:

1. In a control apparatus for an A.C. elevator having a variable-frequency power source which converts direct current into alternating current of a desired frequency, and an induction motor which is driven by A.C. power provided from the variable-frequency power source, thereby to run a cage of the elevator; a control apparatus for an A.C. elevator comprising a braking side current command generator which generates a current command value with a frequency preventive of production of regenerative power from said induction motor when a braking force is applied to said induction motor, a current detector which detects an instantaneous current flowing through said induction motor, and a control device which compares the current command value and the instantaneous current and which controls current to flow through said induction motor, to the current command value.

2. A control apparatus for an A.C. elevator as defined in claim 1, further comprising a power running side current command generator which generates a current command value for power running of said induction motor, a switching device which switchingly supplies said control device with either of the output from said braking side current command generator and the output from said power running side current command generator, and a compensator which causes said switching device to switch on the basis of a difference between a velocity command signal for said motor and an actual velocity signal of said motor.

3. A control apparatus for an A.C. elevator as defined in claim 2, wherein said control device comprises a subtracter which compares the current command value supplied via said switching device and the current value delivered from said detector and which outputs a difference value between them, and an inverter which is controlled by a command signal produced on the basis of the output of said subtracter and which outputs the alternating current of variable voltage and variable frequency.

4. A control apparatus for an A.C. elevator as defined in claim 2, wherein said compensator generates a torque command for said motor on the basis of the difference between the two velocity signals.

5. A control apparatus for an A.C. elevator as defined in claim 4, wherein said power running side current command generator and said braking side current command generator receive the torque command from said compensator and the actual velocity signal of said motor, and they deliver the current command signal for the power running and the current command signal for the braking running on the basis of these inputs respectively, and these output signals are applied to said switching device.

6. A control apparatus for an A.C. elevator as defined in claim 5, wherein said switching device selects and delivers the output of said power running side current command generator when the torque command from said compensator is plus, and it selects and delivers the output of said braking side current command generator when the torque command from said compensator is minus.

* * * * *